(12) United States Patent
Burke

(10) Patent No.: US 8,727,204 B2
(45) Date of Patent: May 20, 2014

(54) EXPANDABLE CARTON

(75) Inventor: Bradley J. Burke, Glendale Heights, IL (US)

(73) Assignee: Graphic Packaging International, Inc., Marietta, GA (US)

(*) Notice: Subject to any disclaimer, the term of this patent is extended or adjusted under 35 U.S.C. 154(b) by 679 days.

(21) Appl. No.: 12/947,118

(22) Filed: Nov. 16, 2010

(65) Prior Publication Data
US 2011/0117258 A1   May 19, 2011

Related U.S. Application Data

(60) Provisional application No. 61/281,330, filed on Nov. 16, 2009.

(51) Int. Cl.
| B65D 5/355 | (2006.01) |
| B65D 81/34 | (2006.01) |

(52) U.S. Cl.
USPC .................. 229/101; 229/235; 426/111

(58) Field of Classification Search
CPC .................................................. B65D 5/0005
USPC .......... 229/101, 235, 240; 220/666; 62/457.1, 62/457.7
See application file for complete search history.

(56) References Cited

U.S. PATENT DOCUMENTS

| 499,655 | A | 6/1893 | Clark |
|---|---|---|---|
| 642,121 | A | 1/1900 | Hildreth |
| 1,145,668 | A | 7/1915 | Brown |
| 1,478,791 | A | 12/1923 | Nelson |
| 1,503,161 | A | 7/1924 | Hornecker |
| 1,564,374 | A | 12/1925 | Smith |
| 1,634,073 | A | 6/1927 | Labombarde |
| 1,656,919 | A | 1/1928 | Marsh |
| 1,762,703 | A | 6/1930 | Smith |
| 1,762,704 | A | 6/1930 | Smith |
| 1,772,625 | A | 8/1930 | Caulfield |
| 1,844,751 | A | 2/1932 | Fink et al. |
| 1,869,751 | A | 8/1932 | Iacobitti |
| 1,901,483 | A | 3/1933 | Ware, Jr. |
| 1,911,215 | A | 5/1933 | Walter |
| 1,925,102 | A | 9/1933 | Levkoff |
| 1,951,408 | A | 3/1934 | Haven |

(Continued)

FOREIGN PATENT DOCUMENTS

| CH | 692 649 A5 | 9/2002 |
| DE | 1 091 851 | 10/1960 |

(Continued)

OTHER PUBLICATIONS

International Search Report and Written Opinion dated Jul. 12, 2011, for PCT/US2010/056813.

*Primary Examiner* — Gary Elkins

(74) *Attorney, Agent, or Firm* — Womble Carlyle Sandridge & Rice, LLP

(57) ABSTRACT

A package for holding a food product. The package comprises a carton comprising a plurality of panels that extend at least partially around an interior of the carton. The plurality of panels comprises at least two side panels. A tear feature extends at least partially across the plurality of panels for at least partially separating the carton into an upper portion and a lower portion. The package also comprises a liner disposed in the interior of the carton. The liner comprises an expandable region proximate to the tear feature of the carton.

25 Claims, 13 Drawing Sheets

(56) References Cited

U.S. PATENT DOCUMENTS

| | | |
|---|---|---|
| 1,971,863 A | 8/1934 | Lupton |
| 2,005,924 A | 6/1935 | Wilson |
| 2,006,203 A | 6/1935 | Leslie |
| 2,027,079 A | 1/1936 | Weiss |
| 2,098,818 A | 11/1937 | Andrews |
| 2,141,743 A | 12/1938 | Ethridge |
| 2,145,430 A | 1/1939 | New |
| 2,152,079 A | 3/1939 | Mott |
| 2,196,243 A | 4/1940 | Bensel |
| 2,251,283 A | 8/1941 | Johnson |
| 2,290,971 A | 7/1942 | King |
| 2,292,573 A | 8/1942 | Kondolf |
| 2,330,294 A | 9/1943 | Leavitt et al. |
| 2,335,913 A | 12/1943 | Buttery |
| 2,337,892 A | 12/1943 | Hultin |
| 2,343,222 A | 2/1944 | Nelson |
| 2,345,486 A | 3/1944 | Leebov |
| 2,346,134 A | 4/1944 | Kirkland et al. |
| 2,348,377 A | 5/1944 | Goodyear |
| 2,355,665 A | 8/1944 | Mabee |
| 2,365,159 A | 12/1944 | Walton |
| 2,383,853 A | 8/1945 | Guyer |
| 2,407,781 A | 9/1946 | Guyer |
| 2,407,802 A | 9/1946 | Stotler |
| 2,416,332 A | 2/1947 | Lehman |
| 2,437,926 A | 3/1948 | Ball |
| 2,502,117 A | 3/1950 | Anderson |
| 2,576,594 A | 11/1951 | Goldstein |
| 2,594,394 A | 4/1952 | Casselman |
| 2,643,589 A | 6/1953 | Weiss |
| 2,679,349 A | 5/1954 | Mullinix |
| 2,701,679 A | 2/1955 | Goldstein |
| 2,706,076 A | 4/1955 | Guyer |
| 2,710,134 A | 6/1955 | Schroeder et al. |
| 2,775,393 A | 12/1956 | Rugg |
| 2,778,557 A | 1/1957 | Moore |
| 2,791,362 A | 5/1957 | Nute |
| 2,810,506 A | 10/1957 | Kessler |
| 2,848,151 A | 8/1958 | O'Neil |
| 2,868,433 A | 1/1959 | Anderson, Jr. |
| 2,875,938 A | 3/1959 | Bramhill |
| 2,933,228 A | 4/1960 | Guyer |
| 2,934,251 A | 4/1960 | Kramer |
| 2,944,726 A | 7/1960 | McCauley |
| 2,955,739 A | 10/1960 | Collura |
| 2,967,610 A | 1/1961 | Ebert et al. |
| 2,973,086 A | 2/1961 | Ball |
| 2,993,632 A | 7/1961 | De Feo |
| 3,002,613 A | 10/1961 | Merkel at al |
| 3,006,165 A * | 10/1961 | Mittelberger ............... 62/457.1 |
| 3,013,712 A | 12/1961 | Wollaeger |
| 3,021,002 A | 2/1962 | Guyer |
| 3,033,362 A | 5/1962 | Marcalus |
| 3,048,324 A | 8/1962 | Anderson |
| 3,090,483 A | 5/1963 | Algree et al. |
| 3,092,301 A | 6/1963 | Selle |
| 3,094,266 A | 6/1963 | Hoff |
| 3,112,856 A | 12/1963 | Macintosh et al. |
| 3,116,866 A | 1/1964 | Boran |
| 3,137,437 A | 6/1964 | Svensson |
| 3,157,342 A | 11/1964 | Grady |
| 3,158,312 A | 11/1964 | Simkins |
| 3,159,326 A | 12/1964 | Stonebanks |
| 3,180,556 A | 4/1965 | Asman |
| 3,184,136 A | 5/1965 | Forbes, Jr. |
| 3,189,251 A | 6/1965 | McFarland |
| 3,265,283 A | 8/1966 | Farquhar |
| 3,276,655 A | 10/1966 | Rasmussen |
| 3,276,671 A * | 10/1966 | Fleitman .................. 229/101 |
| 3,280,968 A | 10/1966 | Craine |
| 3,291,372 A * | 12/1966 | Saidel .................. 229/101.1 |
| 3,355,089 A | 11/1967 | Champlin |
| 3,363,422 A | 1/1968 | Maulini et al. |
| 3,414,182 A | 12/1968 | Fobiano |
| 3,417,911 A | 12/1968 | Hennessey |
| 3,426,955 A | 2/1969 | Olson |
| 3,434,648 A | 3/1969 | Du Barry, Jr. |
| 3,443,971 A | 5/1969 | Wood |
| 3,533,807 A * | 10/1970 | Wakefield ..................... 426/112 |
| 3,561,667 A | 2/1971 | Saltman |
| 3,578,234 A | 5/1971 | Marchisen |
| 3,621,628 A | 11/1971 | Chidsey, Jr. |
| 3,640,447 A | 2/1972 | Forbes, Jr. et al. |
| 3,653,495 A | 4/1972 | Gray |
| 3,669,345 A | 6/1972 | Cole |
| 3,677,458 A | 7/1972 | Gosling |
| 3,680,766 A | 8/1972 | Collura et al. |
| 3,690,544 A | 9/1972 | Meyers |
| 3,744,702 A | 7/1973 | Ellison |
| 3,750,538 A | 8/1973 | Confer |
| 3,759,378 A | 9/1973 | Werth |
| 3,768,719 A | 10/1973 | Johnson |
| 3,786,914 A | 1/1974 | Beutler |
| 3,831,836 A | 8/1974 | Ellison et al. |
| 3,880,341 A | 4/1975 | Bamburg et al. |
| 3,884,348 A | 5/1975 | Ross |
| 3,891,137 A | 6/1975 | Ellison et al. |
| 3,905,646 A | 9/1975 | Brackmann et al. |
| 3,951,333 A | 4/1976 | Forbes, Jr. et al. |
| 3,981,430 A | 9/1976 | Keim |
| 4,008,849 A | 2/1977 | Baber |
| 4,015,768 A | 4/1977 | McLennan |
| 4,027,794 A | 6/1977 | Olson |
| 4,036,423 A | 7/1977 | Gordon |
| 4,046,307 A | 9/1977 | Booth et al. |
| 4,059,220 A | 11/1977 | Lorenz |
| 4,095,735 A | 6/1978 | Stone |
| 4,113,100 A | 9/1978 | Soja et al. |
| 4,141,485 A | 2/1979 | Lambert |
| 4,165,030 A | 8/1979 | Bunger et al. |
| 4,168,003 A | 9/1979 | Wysocki |
| 4,194,677 A | 3/1980 | Wysocki |
| 4,308,956 A | 1/1982 | Steinke et al. |
| 4,328,923 A | 5/1982 | Graser |
| 4,341,338 A | 7/1982 | Arnold, deceased |
| 4,344,537 A | 8/1982 | Austin |
| 4,345,393 A | 8/1982 | Price et al. |
| 4,371,109 A | 2/1983 | Tanner et al. |
| 4,378,905 A | 4/1983 | Roccaforte |
| 4,380,314 A | 4/1983 | Langston, Jr. et al. |
| 4,448,309 A * | 5/1984 | Roccaforte et al. ........... 426/111 |
| 4,453,665 A * | 6/1984 | Roccaforte et al. ........... 426/111 |
| 4,458,810 A | 7/1984 | Mahoney |
| 4,484,683 A | 11/1984 | Werner, Jr. |
| 4,498,619 A | 2/1985 | Roccaforte |
| 4,508,218 A | 4/1985 | Focke et al. |
| 4,512,476 A | 4/1985 | Herrington, Jr. |
| 4,519,538 A | 5/1985 | Omichi |
| 4,546,914 A | 10/1985 | Roccaforte |
| 4,548,318 A | 10/1985 | Boyle |
| 4,558,785 A | 12/1985 | Gordon |
| 4,566,593 A | 1/1986 | Muller |
| 4,572,423 A | 2/1986 | Spencer |
| 4,584,202 A * | 4/1986 | Roccaforte ................... 426/111 |
| 4,586,643 A | 5/1986 | Halabisky et al. |
| 4,586,649 A * | 5/1986 | Webinger ..................... 229/240 |
| 4,588,084 A | 5/1986 | Holley, Jr. |
| 4,608,038 A | 8/1986 | Virta et al. |
| 4,621,736 A | 11/1986 | Roccaforte |
| 4,645,108 A | 2/1987 | Gavin et al. |
| 4,676,394 A | 6/1987 | Hiersteiner |
| 4,742,917 A | 5/1988 | Bornwasser et al. |
| 4,746,019 A | 5/1988 | Prater |
| 4,760,952 A | 8/1988 | Wachter et al. |
| 4,768,703 A | 9/1988 | Sosler et al. |
| 4,773,541 A | 9/1988 | Riddell |
| 4,778,057 A | 10/1988 | Allen et al. |
| 4,781,317 A | 11/1988 | Ditto |
| 4,793,550 A | 12/1988 | Gottlieb |
| 4,804,138 A | 2/1989 | McFarland |
| 4,815,609 A | 3/1989 | Kiedaisch |
| 4,863,052 A | 9/1989 | Lambert |
| 4,865,187 A | 9/1989 | Zulauf et al. |
| 4,886,160 A | 12/1989 | Kligerman |

(56) References Cited

U.S. PATENT DOCUMENTS

| | | |
|---|---|---|
| 4,905,898 A | 3/1990 | Wade |
| 4,909,395 A | 3/1990 | Weissman |
| 4,911,177 A | 3/1990 | Lamb et al. |
| 4,913,292 A | 4/1990 | Field |
| 4,919,269 A | 4/1990 | Wright et al. |
| 4,946,093 A | 8/1990 | Moorman |
| 4,946,540 A | 8/1990 | Mitchard |
| 4,948,033 A | 8/1990 | Halsell, II et al. |
| 4,989,735 A | 2/1991 | O'Brien |
| 5,012,929 A | 5/1991 | Roosa |
| 5,012,959 A | 5/1991 | Gordon |
| 5,020,337 A | 6/1991 | Krieg |
| 5,050,742 A | 9/1991 | Muckenfuhs |
| 5,069,359 A | 12/1991 | Liebel |
| 5,071,010 A | 12/1991 | Carufel/Zeman |
| 5,072,876 A | 12/1991 | Wilson |
| 5,083,667 A | 1/1992 | Holder |
| 5,092,516 A | 3/1992 | Kastanek |
| 5,094,359 A | 3/1992 | DeMars et al. |
| 5,125,568 A | 6/1992 | Bauer |
| 5,129,875 A | 7/1992 | Chaygneaud-Dupuy |
| 5,141,150 A | 8/1992 | Plaessmann |
| 5,181,650 A | 1/1993 | Hollander et al. |
| 5,222,660 A | 6/1993 | Koss |
| 5,238,181 A | 8/1993 | Mahler |
| 5,251,808 A | 10/1993 | Rudd |
| 5,285,956 A | 2/1994 | Piepho |
| 5,292,058 A | 3/1994 | Zoss et al. |
| 5,328,091 A | 7/1994 | Koss |
| 5,347,865 A | 9/1994 | Mulry et al. |
| 5,356,022 A | 10/1994 | Tipps |
| 5,373,960 A | 12/1994 | Gunn et al. |
| 5,386,937 A | 2/1995 | Crawford |
| 5,429,297 A | 7/1995 | Walsh |
| 5,450,680 A | 9/1995 | Bromberg |
| 5,472,090 A | 12/1995 | Sutherland |
| 5,495,727 A | 3/1996 | Strong et al. |
| 5,505,372 A | 4/1996 | Edson et al. |
| 5,544,806 A | 8/1996 | Anderson et al. |
| 5,551,566 A | 9/1996 | Sutherland |
| 5,551,938 A | 9/1996 | Stone |
| 5,582,343 A | 12/1996 | Dalvey |
| 5,584,430 A | 12/1996 | Mulry |
| 5,588,585 A | 12/1996 | McClure |
| 5,599,267 A | 2/1997 | Dupuy |
| 5,601,521 A | 2/1997 | Plamas Xapelli |
| 5,632,402 A | 5/1997 | Walsh et al. |
| 5,632,404 A | 5/1997 | Walsh |
| 5,639,017 A | 6/1997 | Fogle |
| 5,678,755 A | 10/1997 | Block |
| 5,699,957 A | 12/1997 | Blin et al. |
| 5,709,766 A | 1/1998 | Press et al. |
| 5,746,871 A | 5/1998 | Walsh |
| 5,757,930 A | 5/1998 | Seidemann et al. |
| 5,775,576 A | 7/1998 | Stone |
| 5,783,030 A | 7/1998 | Walsh |
| 5,794,778 A | 8/1998 | Harris |
| 5,794,811 A | 8/1998 | Walsh |
| 5,794,812 A | 8/1998 | Walsh |
| 5,796,778 A | 8/1998 | Kurker |
| 5,810,250 A | 9/1998 | Stone et al. |
| 5,826,783 A | 10/1998 | Stout |
| 5,842,576 A | 12/1998 | Snow |
| 5,857,570 A | 1/1999 | Brown |
| 5,857,614 A | 1/1999 | Walsh |
| 5,873,515 A | 2/1999 | Dunn et al. |
| 5,881,884 A | 3/1999 | Podosek |
| 5,893,513 A | 4/1999 | Stone et al. |
| 5,915,546 A | 6/1999 | Harrelson |
| 5,918,799 A | 7/1999 | Walsh |
| 5,921,398 A | 7/1999 | Carroll |
| 5,927,498 A | 7/1999 | Saam |
| 5,960,555 A | 10/1999 | Deaton et al. |
| 5,967,374 A | 10/1999 | Baker |
| 5,979,749 A | 11/1999 | Bozich |
| 5,992,733 A | 11/1999 | Gomes |
| 5,996,797 A | 12/1999 | Flaig |
| D419,440 S | 1/2000 | Hansen |
| 6,015,084 A | 1/2000 | Mathieu et al. |
| 6,021,897 A | 2/2000 | Sutherland |
| 6,027,017 A | 2/2000 | Kuhn et al. |
| 6,027,018 A | 2/2000 | Yocum |
| 6,059,182 A | 5/2000 | Wein |
| 6,065,590 A | 5/2000 | Spivey |
| 6,102,277 A | 8/2000 | Krapohl, Sr. |
| 6,110,095 A | 8/2000 | Finke et al. |
| 6,112,977 A | 9/2000 | Sutherland et al. |
| 6,129,211 A | 10/2000 | Prakken et al. |
| 6,131,729 A | 10/2000 | Eckermann et al. |
| 6,135,289 A | 10/2000 | Miller |
| 6,145,736 A | 11/2000 | Ours et al. |
| 6,158,653 A | 12/2000 | Kanter et al. |
| 6,164,526 A | 12/2000 | Dalvey |
| 6,189,777 B1 | 2/2001 | Hutchinson et al. |
| 6,221,192 B1 | 4/2001 | Walsh |
| 6,230,881 B1 | 5/2001 | Collura |
| 6,332,488 B1 | 12/2001 | Walsh |
| 6,352,096 B1 | 3/2002 | Walsh |
| 6,364,202 B1 | 4/2002 | Zelley |
| 6,386,639 B1 | 5/2002 | McMichael |
| 6,419,152 B1 | 7/2002 | Tokarski |
| 6,435,402 B1 | 8/2002 | Hengami |
| 6,478,159 B1 | 11/2002 | Taylor et al. |
| 6,510,982 B2 | 1/2003 | White et al. |
| 6,520,404 B1 | 2/2003 | Waldburger et al. |
| 6,523,692 B2 | 2/2003 | Gregory |
| 6,568,586 B1 | 5/2003 | VanEsley et al. |
| 6,631,803 B2 | 10/2003 | Rhodes et al. |
| 6,689,034 B2 | 2/2004 | Walsh et al. |
| 6,729,475 B2 | 5/2004 | Yuhas et al. |
| 6,761,269 B2 | 7/2004 | Hamming |
| 6,834,793 B2 | 12/2004 | Sutherland |
| 6,854,639 B2 | 2/2005 | Walsh |
| 6,869,009 B2 | 3/2005 | Sutherland et al. |
| 6,889,892 B2 | 5/2005 | Walsh et al. |
| 6,905,027 B2 | 6/2005 | Galter |
| 6,913,189 B2 | 7/2005 | Oliff et al. |
| 6,918,487 B2 | 7/2005 | Harrelson |
| 6,926,193 B2 | 8/2005 | Smalley |
| 6,948,293 B1 | 9/2005 | Eckermann et al. |
| 6,997,316 B2 | 2/2006 | Sutherland |
| 7,021,468 B2 | 4/2006 | Cargile, Jr. |
| 7,025,504 B2 | 4/2006 | Olin |
| 7,201,714 B2 | 4/2007 | Zoeckler et al. |
| 7,380,701 B2 | 6/2008 | Fogle et al. |
| 7,407,087 B2 | 8/2008 | DeBusk et al. |
| 7,416,109 B2 | 8/2008 | Sutherland |
| 7,601,111 B2 | 10/2009 | Sutherland et al. |
| 7,611,042 B2 | 11/2009 | Bates et al. |
| 7,668,318 B2 | 2/2010 | Goldfinch et al. |
| 7,699,215 B2 | 4/2010 | Spivey, Sr. |
| 7,717,322 B2 | 5/2010 | Walsh et al. |
| 7,762,394 B2 | 7/2010 | Bradford et al. |
| 2001/0048022 A1 | 12/2001 | Zoeckler |
| 2002/0022560 A1 | 2/2002 | Zoeckler et al. |
| 2002/0036153 A1 | 3/2002 | Yang |
| 2002/0055429 A1 | 5/2002 | Walsh |
| 2002/0060240 A1 | 5/2002 | Walsh et al. |
| 2002/0170845 A1 | 11/2002 | Oliff |
| 2003/0144121 A1 | 7/2003 | Walsh et al. |
| 2003/0226879 A1 | 12/2003 | Auclair et al. |
| 2004/0007614 A1 | 1/2004 | Saulas |
| 2004/0226989 A1 | 11/2004 | Cook et al. |
| 2005/0092649 A1 | 5/2005 | Ford et al. |
| 2005/0103681 A1 | 5/2005 | Aubry et al. |
| 2005/0109827 A1 | 5/2005 | Martin |
| 2005/0133579 A1 | 6/2005 | Smorch et al. |
| 2005/0167291 A1 | 8/2005 | Sutherland |
| 2005/0187087 A1 | 8/2005 | Walsh |
| 2005/0218203 A1 | 10/2005 | Harrelson |
| 2006/0049067 A1 | 3/2006 | McDonald |
| 2006/0243783 A1 | 11/2006 | Spivey et al. |
| 2006/0255105 A1 | 11/2006 | Sweet |
| 2006/0255107 A1 | 11/2006 | Wright |

(56) References Cited

U.S. PATENT DOCUMENTS

| | | |
|---|---|---|
| 2006/0266815 A1 | 11/2006 | Coltri-Johnson et al. |
| 2006/0268810 A1 | 11/2006 | Cheng |
| 2006/0273143 A1 | 12/2006 | Finch |
| 2007/0000984 A1 | 1/2007 | McClure |
| 2007/0051781 A1 | 3/2007 | Holley |
| 2007/0080199 A1 | 4/2007 | Sutherland |
| 2007/0131749 A1 | 6/2007 | Coltri-Johnson et al. |
| 2007/0181658 A1 | 8/2007 | Sutherland |
| 2007/0284424 A1 | 12/2007 | Holley |
| 2011/0309134 A1* | 12/2011 | Weissbrod .................. 229/101 |

FOREIGN PATENT DOCUMENTS

| | | |
|---|---|---|
| DE | 2 320 190 | 4/1973 |
| DE | 29 23 455 | 9/1979 |
| DE | 81 10 323.9 | 4/1981 |
| DE | 87 08 078.8 | 9/1987 |
| DE | 3 627 019 | 2/1988 |
| DE | 89 08 393 | 9/1989 |
| DE | 94 13 813 U1 | 8/1994 |
| DE | 297 03 082 | 6/1998 |
| DE | 298 17 195 U1 | 9/1998 |
| DE | 202 16 854 U1 | 2/2002 |
| DE | 20 2004 018 649 U1 | 4/2005 |
| DE | 102005005500 | 3/2006 |
| DE | 102005053561 | 5/2007 |
| EP | 0 079 155 | 5/1983 |
| EP | 0 133 595 | 2/1985 |
| EP | 0 412 226 A1 | 2/1991 |
| EP | 0 542 449 | 5/1993 |
| EP | 0 704 386 | 4/1996 |
| EP | 1 457 425 | 9/2004 |
| FR | 1 379 931 | 12/1963 |
| FR | 1 494 239 | 9/1967 |
| FR | 2 579 175 | 9/1986 |
| FR | 2 699 150 | 12/1992 |
| FR | 2 686 316 | 7/1993 |
| FR | 2 755 670 | 5/1998 |
| FR | 2 882 032 | 8/2006 |
| GB | 104445 | 6/1916 |
| GB | 1 218 016 | 1/1971 |
| GB | 1 242 356 | 8/1971 |
| GB | 1 489 963 | 10/1977 |
| GB | 1 584 066 | 2/1981 |
| GB | 2 137 172 | 10/1984 |
| GB | 2 275 913 | 9/1994 |
| GB | 2 361 000 | 10/2001 |
| GB | 2 363 372 | 12/2001 |
| GB | 2 379 923 | 3/2003 |
| JP | 44-25911 | 10/1969 |
| JP | 57-123729 | 8/1982 |
| JP | 59-181025 | 12/1984 |
| JP | 08-198349 A | 8/1996 |
| JP | 2004-042953 A | 2/2004 |
| JP | 53-39118 | 3/2010 |
| WO | WO 92/01606 | 2/1992 |
| WO | WO 95/28325 A1 | 10/1995 |
| WO | WO 98/31593 | 4/1997 |
| WO | WO 97/27114 | 7/1997 |
| WO | WO 02/11516 | 7/1998 |
| WO | WO 03/051622 | 6/2003 |
| WO | WO 03/082686 | 9/2003 |
| WO | WO 2004/063031 | 7/2004 |
| WO | WO 2006/133401 | 12/2006 |
| WO | WO 2007/089282 A2 | 8/2007 |

\* cited by examiner

EXPANDABLE CARTON

CROSS-REFERENCE TO RELATED APPLICATIONS

This application claims the benefit of U.S. Provisional Patent Application No. 61/281,330, filed Nov. 16, 2009.

INCORPORATION BY REFERENCE

U.S. Provisional Patent Application No. 61/281,330, which was filed on Nov. 16, 2009, is hereby incorporated by reference for all purposes as if presented herein in its entirety.

BACKGROUND OF THE DISCLOSURE

The present disclosure generally relates to packages for holding and heating food products and to packages that expand when heated.

SUMMARY OF THE DISCLOSURE

In one aspect, the disclosure is generally directed to a package for holding a food product. The package comprises a carton comprising a plurality of panels that extend at least partially around an interior of the carton. The plurality of panels comprises at least two side panels. A tear feature extends at least partially across the plurality of panels for at least partially separating the carton into an upper portion and a lower portion. The package also comprises a liner disposed in the interior of the carton. The liner comprises an expandable region proximate to the tear feature of the carton.

In general, another aspect of the disclosure is directed to the combination of a carton blank and a liner for forming a package for holding a food product. The carton blank comprises a plurality of panels comprising at least two side panels. A tear feature extends at least partially across the plurality of panels. The tear feature extends between an upper portion and a lower portion of each panel of the plurality of panels. The liner comprises an expandable region. At least a portion of the liner is in face-to-face contact with at least a portion of an interior surface of the carton blank. The expandable region of the liner is proximate to the tear feature of the carton.

In general, another aspect of the disclosure is directed to a method of forming a package for holding a food product. The method comprises obtaining a carton blank comprising a plurality of panels comprising at least two side panels, and a tear feature extending at least partially across the plurality of panels. The method also comprises obtaining a liner comprising an expandable region and positioning at least a portion of the liner in face-to-face contact with at least a portion of an interior surface of the carton blank so that the expandable region of the liner is proximate to the tear feature of the carton. The method also comprises forming an interior of a carton by respectively folding the plurality of panels of the carton blank, wherein the tear feature extends between an upper portion and a lower portion of the carton.

In general, another aspect of the disclosure is directed to a method of heating a food product in a package. The method comprises obtaining a package comprising a carton comprising a plurality of panels that extend at least partially around an interior of the carton. The plurality of panels comprises at least two side panels. A tear feature extends at least partially across the plurality of panels. A liner is disposed in the interior of the carton. The liner comprises an expandable region proximate to the tear feature of the carton. The method also comprises at least partially closing an end of the carton with the at least one end flap and at least partially separating the carton into an upper portion and a lower portion at the tear feature.

Those skilled in the art will appreciate the above stated advantages and other advantages and benefits of various additional embodiments reading the following detailed description of the embodiments with reference to the below-listed drawing figures.

According to common practice, the various features of the drawings discussed below are not necessarily drawn to scale. Dimensions of various features and elements in the drawings may be expanded or reduced to more clearly illustrate the embodiments of the disclosure.

BRIEF DESCRIPTION OF THE DRAWINGS

Corresponding parts are designated by corresponding reference numbers throughout the drawings.

DETAILED DESCRIPTION OF THE EXEMPLARY EMBODIMENTS

The package of the present disclosure can be useful in containing a food product such as any suitable type of food product that can be heated or cooked in a microwave oven. For example, the food product could include frozen food products or nonfrozen food products. Some suitable food products could comprises a frozen pizza, a frozen sandwich, frozen vegetables, popcorn, or any other suitable food product. Further, the package of the present disclosure can be used for heating, cooking, browning, crisping, etc. the food product by use of a heating or cooking device such as a microwave oven. It is understood that food products other than the food products listed herein may be contained in the package. Further, food products contained in this package may be generally triangular, round, square, rectangular, irregular, or any other shape. In this specification, the terms "lower," "bottom," "upper" and "top" indicate orientations determined in relation to fully erected and upright packages.

Figure 1:
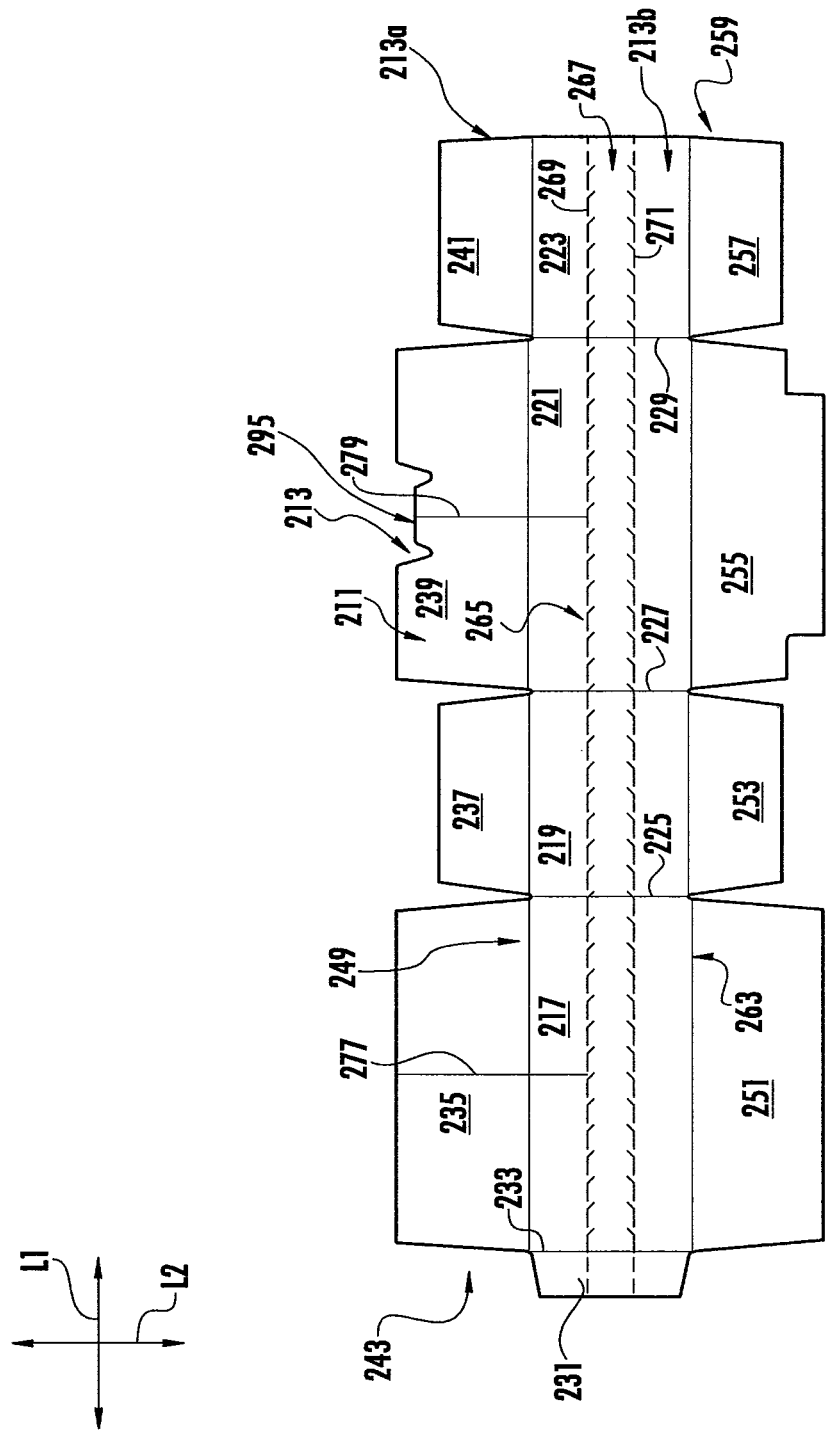
FIG. 1 is a plan view of a blank for forming an exemplary carton according to one embodiment of the disclosure.
Figure 6C:
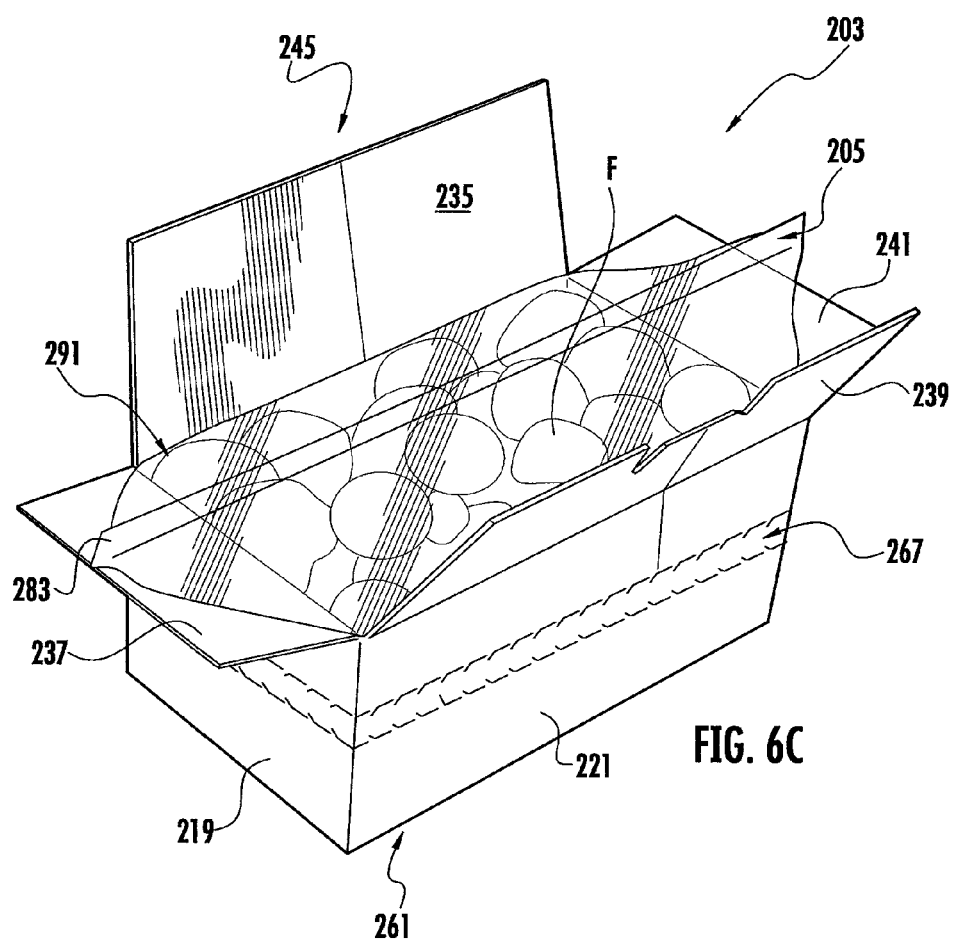
Figure 7:
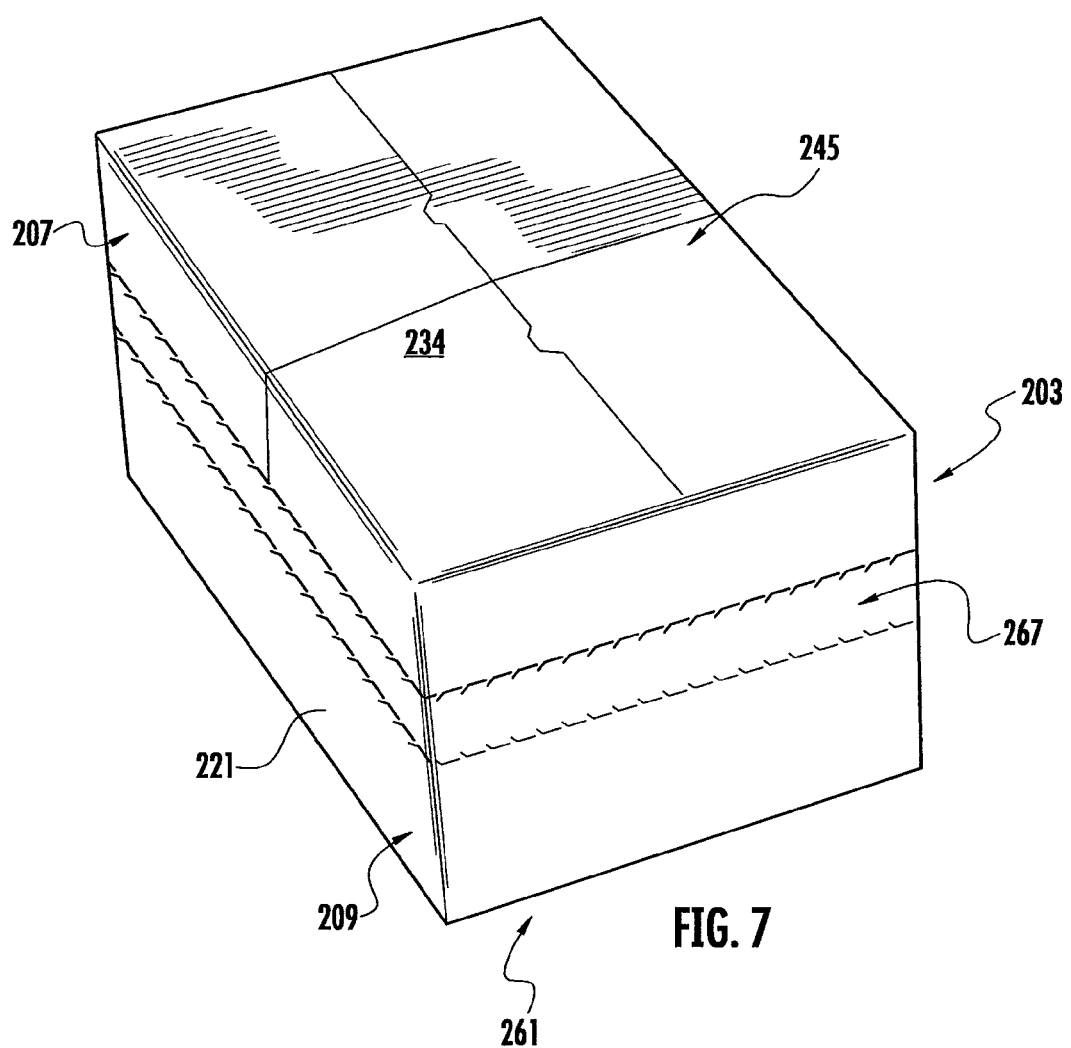
FIG. 7 is a perspective view of the closed carton according to one embodiment of the disclosure.

FIG. 1 is a plan view of an exterior side 211 of a blank, generally indicated at 213, used to form a carton 203 (FIG. 7) of an expandable package 201 for heating or cooking a food product F (FIG. 6C) according to an exemplary embodiment of the disclosure. The package 201 can used to hold other nonfood products or items without departing from the disclosure. The package 201 comprises a carton 203 having a liner 205 that allows an upper portion 207 of the carton to be positioned away from a lower portion 209 of the carton in a manner that the interior volume of the carton 203 in the expanded position (FIG. 9) is greater than the interior volume of the carton in the closed position (FIG. 7). In the illustrated embodiment, the package 201 can be suitable for holding any number of food products including a single food product or more than two food products. Further, the package 201 and blank 213 can be alternatively sized, shaped and/or otherwise arranged to hold food products or nonfood products. In one embodiment, the package 201 is useful for holding the food product during storage in a freezer, during heating and/or cooking in a microwave oven (not shown), and/or during serving or consumption of the heated and/or cooked food product. In the illustrated embodiment, the carton 203 includes a tear feature including a tear strip 267.

As shown in FIG. 1, the blank 213 has a longitudinal axis L1 and a lateral axis L2. In the illustrated embodiment, the blank 213 comprises a first side panel 217 foldably connected to a second side panel 219 at a first lateral fold line 225. A third side panel 221 is foldably connected to the second side panel 219 at a second lateral fold line 227. A fourth side panel 223 is foldably connected to the third side panel 221 at a third lateral fold line 229. In the illustrated embodiment, an adhesive flap 231 is foldably connected to the first side panel 217 at a fourth lateral fold line 233. Alternatively, the adhesive flap 231 can be foldably connected to the fourth side panel 223 without departing from the scope of this disclosure. The carton 203 can be otherwise configured to have any number of side panels and/or adhesive flaps without departing from the scope of this disclosure.

In the illustrated embodiment, the first side panel 217 is foldably connected to a first top end flap 235 and a first bottom end flap 251. The second side panel 219 is foldably connected to a second top end flap 237 and a second bottom end flap 253. The third side panel 221 is foldably connected to a third top end flap 239 and a third bottom end flap 255. The fourth side panel 222 is foldably connected to a fourth top end flap 241 and a fourth bottom end flap 257. When the carton 203 is erected, the top end flaps 235, 237, 239, 241 close a top end 245 of the carton, and bottom end flaps 251, 253, 255, 257 close a bottom end 261 of the carton. In accordance with an alternative embodiment of the disclosure, different flap arrangements can be used for closing the ends 245, 261 of the carton 203

In one embodiment, the top end flaps 235, 237, 239, 241 extend along a first, or top, marginal end 243 of the blank 213, and are foldably connected at a first longitudinal fold line 249 that extends along the length of the blank. The bottom end flaps 251, 253, 255, 257 extend along a second, or bottom, marginal end 259 of the blank, and are foldably connected at a second longitudinal fold line 263 that extends along the length of the blank. The longitudinal fold lines 249, 263 may be, for example, substantially straight, offset at one or more locations to account for blank thickness or for other factors, continuous, discontinuous, oblique, or any other shape or configuration.

Figure 9:
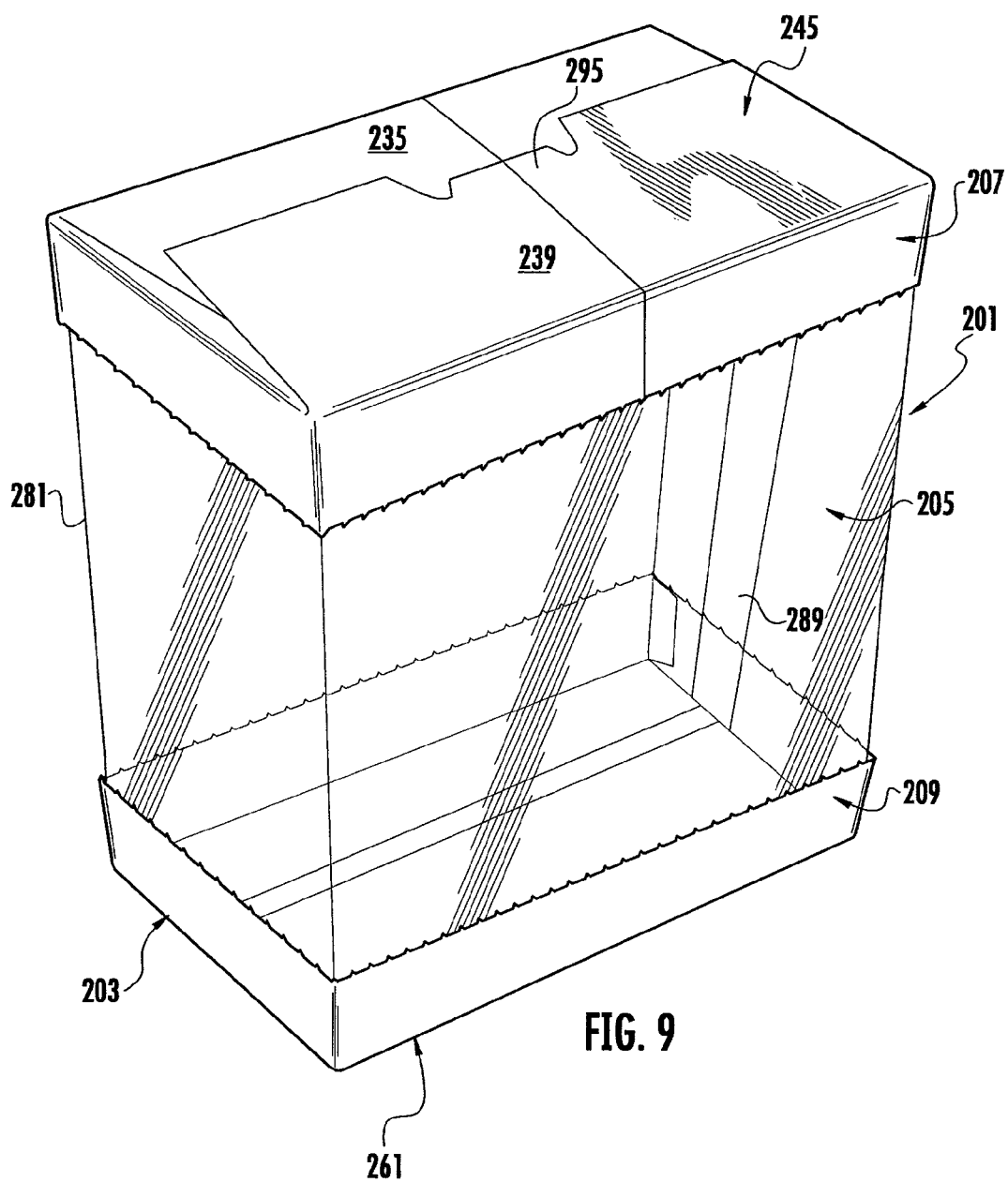
FIGS. 9 and 10 are perspective views of the carton in an expanded position according to one embodiment of the disclosure.

As shown in FIG. 1, the blank 213 can include a tear feature, generally indicated at 265, for separating the upper portion 207 of the carton 203 from the lower portion. 209 of the carton (FIG. 9). The tear feature 265 comprises a tear strip 267 comprising two spaced apart tear lines 269, 271 that extend across the entire length of the blank 213 in the longitudinal direction L1. The tear strip 267 divides the blank 213 into an upper portion 213a including the top end flaps 235, 237, 239, 241 and a lower portion 213b including the bottom end flaps 251, 253, 255, 257. Alternatively, the tear strip 267 could be a single tear line or other form of weakening without departing from the disclosure. Further, the tear feature 265 could comprise multiple forms of weakening. For example, the tear feature could comprise a tear line extending in one or more panels and a cut line extending in one or more other panels. In another alternative, the tear strip 267 could be other than straight (e.g., oblique or curved) or could have portions in a respective one or more side panels 217, 219, 221, 223 that are offset.

In one embodiment, an access feature or extended tab (not shown) can be included at one or both ends of the tear strip 267. For example an access feature can be included in the fourth panel 223 proximate or at the end of the tear strip 267. Such an access feature can help initiate tearing of the tear strip 267.

In the illustrated embodiment, the liner 205 is a clear polymeric film or material that is adhesively secured to the side panels 217, 219, 221, 223 on the interior side of the blank 213 on either side of the tear strip 267. The liner 205 has portions that overlap the adhered portions that are free from attachment to the blank so that the liner is expandable when the upper portion 207 of the carton 203 is separated from the lower portion 209 of the carton. The liner 205 could be other polymeric or non-polymeric materials and could be other materials that are clear or other materials that are not clear. Further, the liner 205 could have venting apertures that allow venting of hot air or steam from the interior of the package 201.

Figure 2:
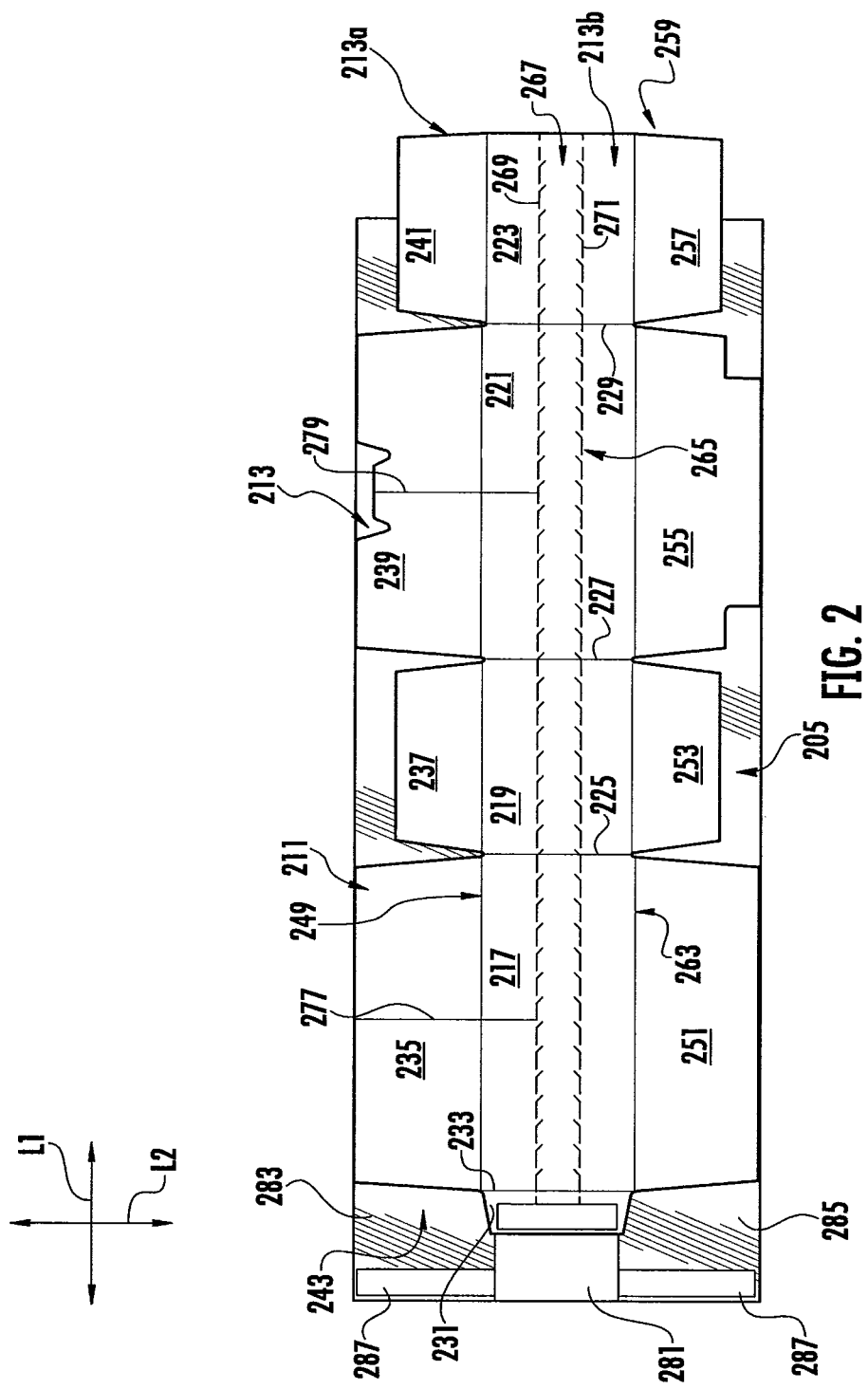
FIG. 2 is a plan view of the blank of FIG. 1 overlaying a liner.
Figure 3:
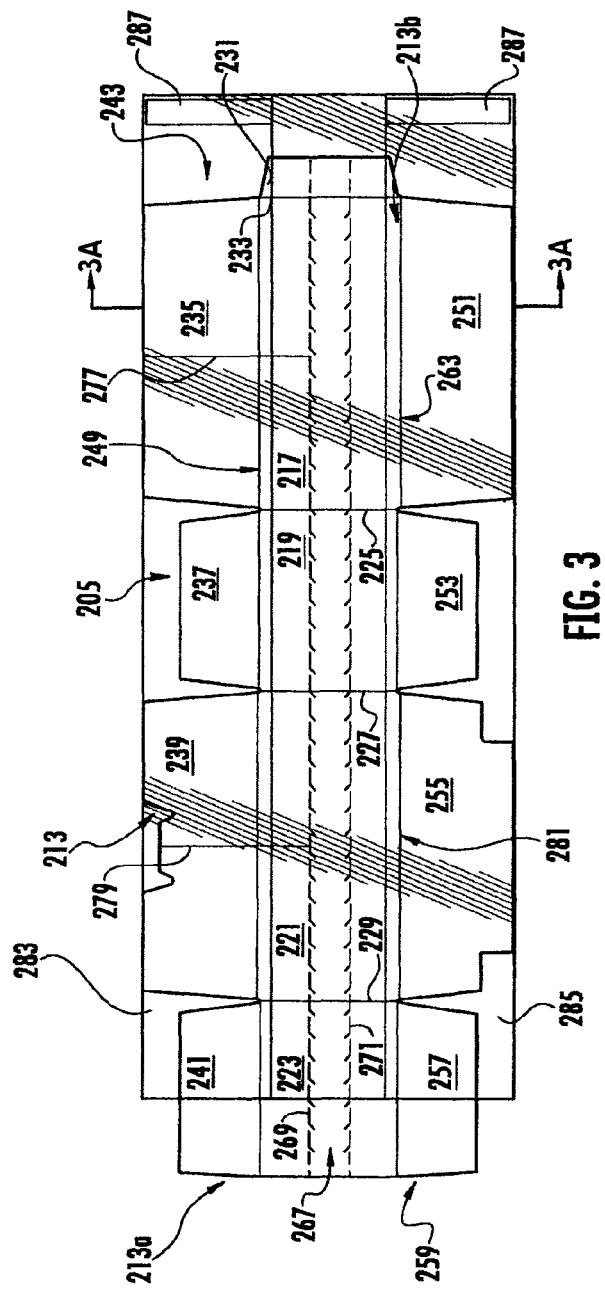
FIG. 3 is a plan view of the blank and liner of FIG. 2 showing the interior side of the blank.
Figure 3A:
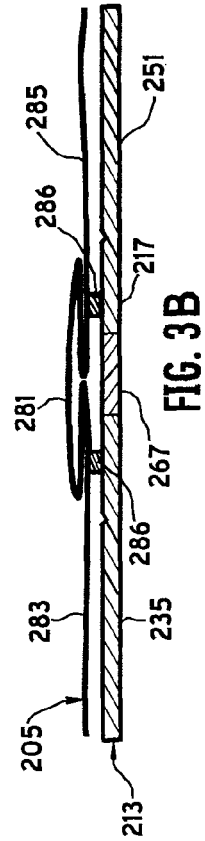
FIG. 3A is a cross-sectional schematic view of the blank and liner taken at line 3A-3A of FIG. 3.
Figure 3B:
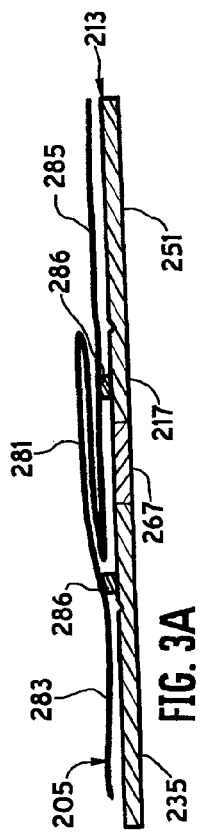
FIG. 3B is a cross-sectional schematic view of the blank and liner showing an alternate fold of the liner according to one embodiment of the disclosure.

As shown in FIGS. 2 and 3, the liner 205 includes an expandable region 281, an upper region 283, and a lower region 285. The expandable region 281 is foldably connected to the upper region 283 and the lower region 285 and extends along the length of the liner. The expandable region 281 includes at least two layers that are folded over and can overlap the upper region 283, the lower region 285, or both. In one embodiment, the expandable region 281 can be folded as shown in FIG. 3A. In an alternative embodiment, the expandable region 281 is folded as shown in FIG. 3B. The upper region 283 is glued or otherwise secured to at least a portion of each of the side panels 217, 219, 221, 223 in the upper portion 213a of the blank 213. The lower region 285 is glued or otherwise secured to at least a portion of each of the side panels 217, 219, 221, 223 in the lower portion 213b of the blank. In one embodiment, the upper region 283 and the lower region 285 are secured with adhesive 286 (FIGS. 3A and 3B), which extends along the length of the blank. Alternatively, the upper region 283 and the lower region 285 can be secured to any number of the side panels in the respective upper portion 213a and lower portion 213b. While, in the illustrated embodiment, the upper and lower regions 283, 285 are not secured to the tear feature 265, the upper and lower regions can overlap the tear feature, and the upper and lower regions can overlap or abut one another. Alternatively, the upper region 283 can be spaced apart from the lower region 285. Further, each of the upper region 283, the lower region 285, and the expandable region 281 can be otherwise shaped or arranged without departing from the scope of this disclosure.

Figure 4:
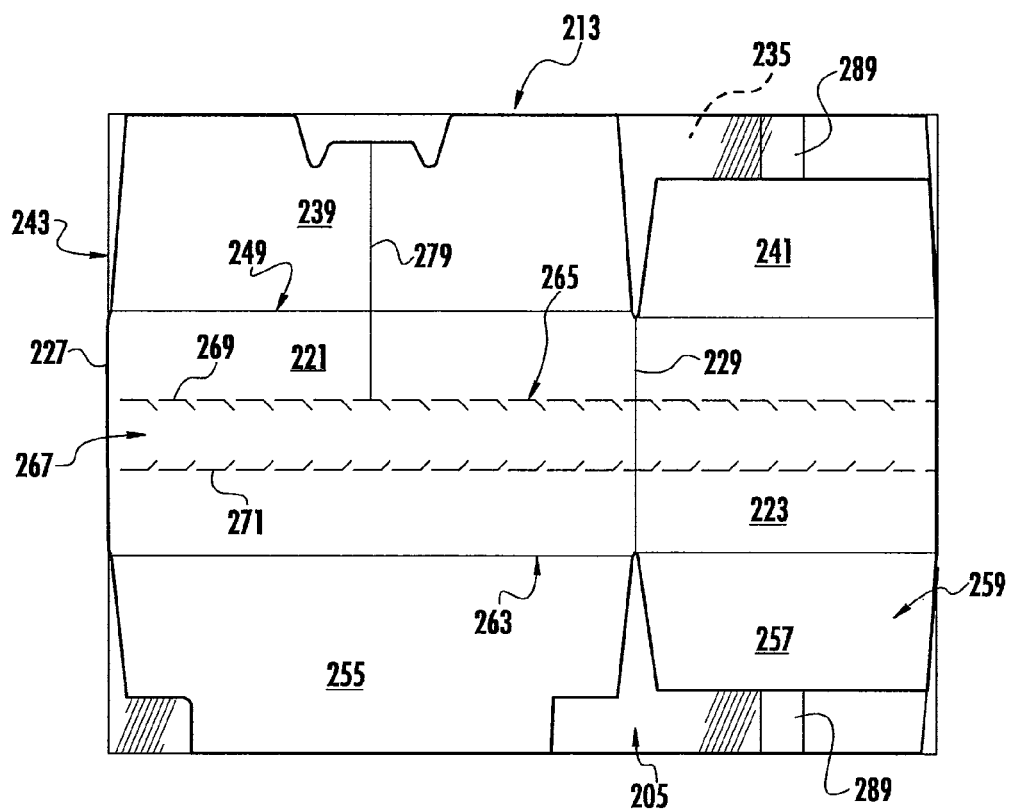
FIG. 4 is view of the partially-assembled package according to one embodiment of the disclosure.
Figure 5:
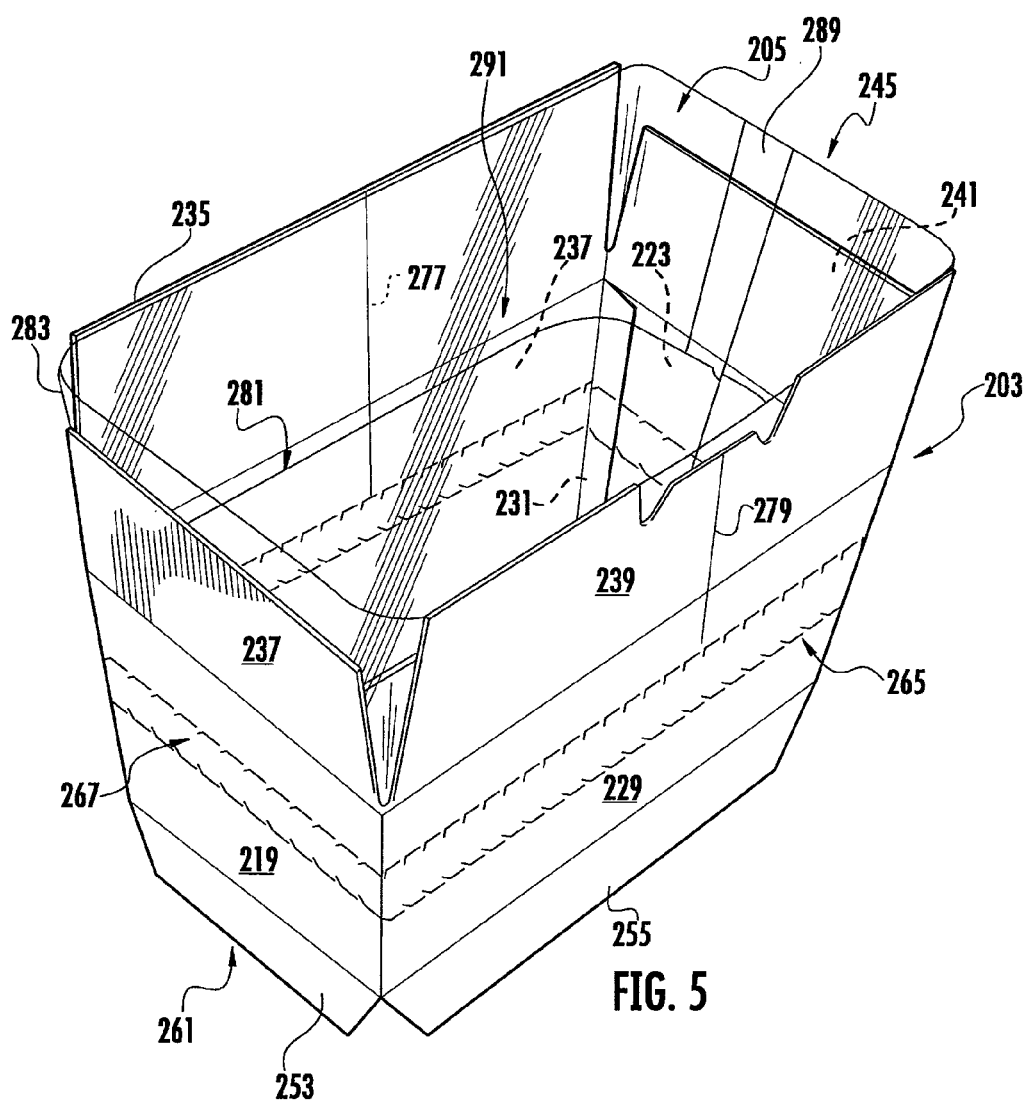
FIG. 5 is a perspective view of an open-ended sleeve formed from the blank with the liner attached to the interior surface of the sleeve according to one embodiment of the disclosure.

FIGS. 4-10 show various views of a method of forming the package 201 and of opening the package. As shown in FIG. 4, the blank 213 can be folded along lateral fold line 227 with the liner 205 disposed between the overlapping side panels. The portions of upper and lower regions 283, 285 of the liner 205 extending beyond the adhesive flap 231 are overlapped with and glued to the portions of upper and lower regions 283, 285 overlapping the fourth side panel 223 and the fourth end flaps 241, 257 at adhesive regions 287 (FIGS. 2 and 3). The overlapped portions of the upper and lower regions 283, 285 form an overlapped region 289 (FIG. 4). The adhesive flap 231 is adhered to the inner surface of the fourth side panel 223. The blank 213 is folded along lateral fold lines 225, 227, 229, 233 to form an open-ended sleeve having an open top end 245, an open bottom end 261, and a carton interior 291 (FIG. 5).

Figure 6A:
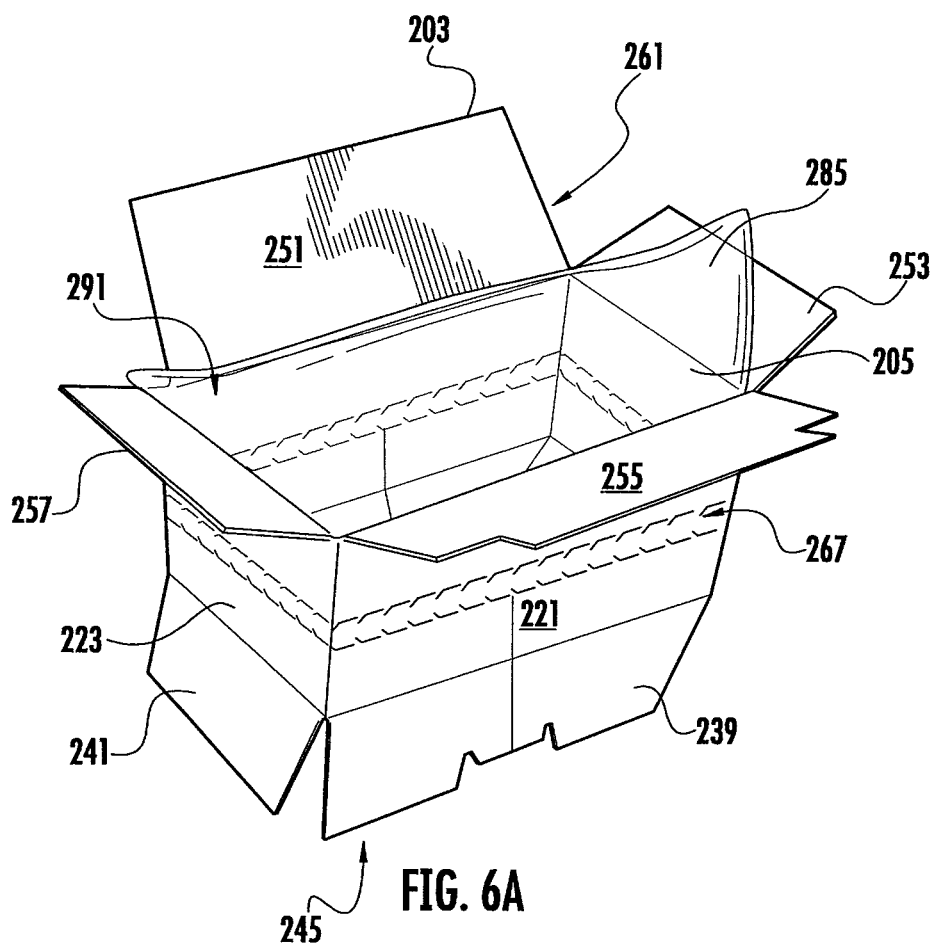
FIGS. 6A-6C are perspective views showing the closing of the ends of the sleeve of FIG. 5.
Figure 6B:
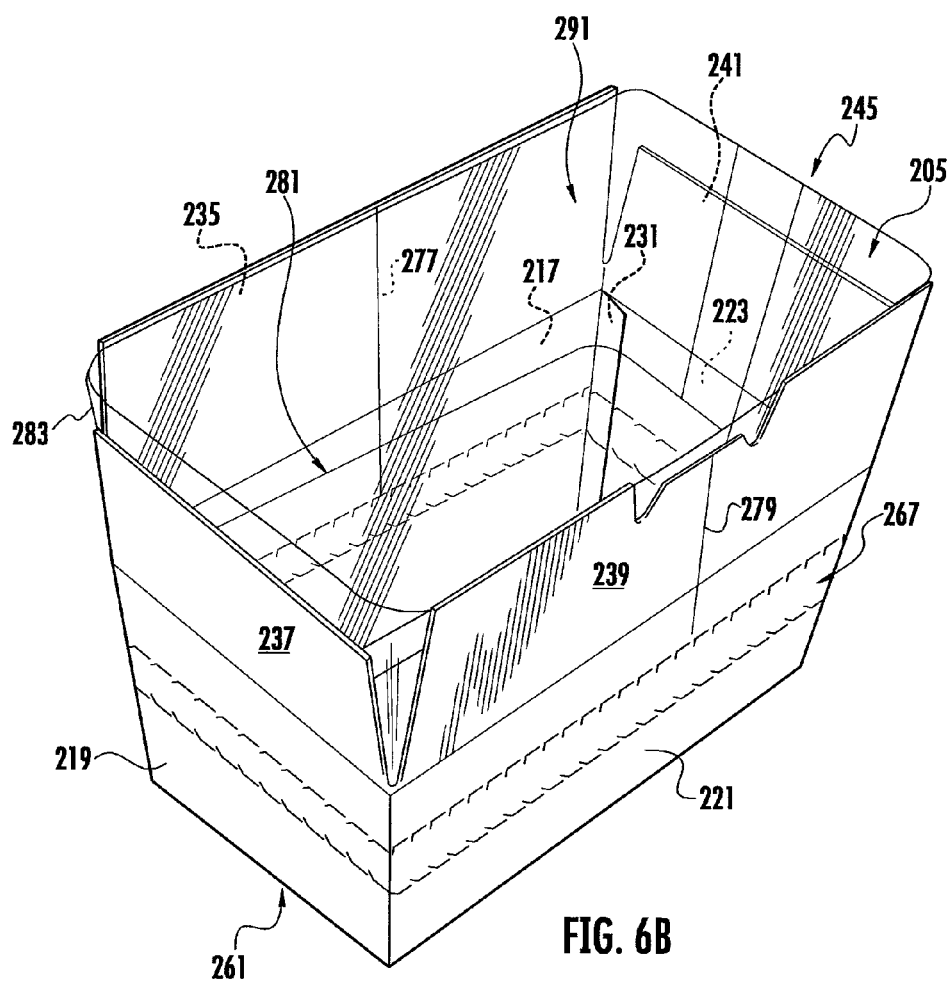

As shown in FIG. 6A, the lower region 285 can be sealed or otherwise closed at the bottom end 261 such as by sealing one portion of the lower region against another portion of the lower region. In one embodiment, the seal is a substantially air tight seal. Alternatively, the lower region 285 can be left open. The bottom end 261 of the carton 203 is closed by overlapping and adhering the bottom end flaps 251, 253, 255, 257 (FIG. 6B). A food product or other product F (FIG. 6C) to be placed in the package 201 is placed in the interior 291 of the partially assembled carton of FIG. 6B having a closed bottom end 261. In one embodiment, the blank 213 has score lines 277, 279 that allow the open top end 245 to flex into an oblique or rounded shape that allows easy loading or removal of a product from the package 201. The score lines 277, 279 extend in the lateral direction L2 of the blank 213 and extend from a free edge of a respective top end flap 235, 239 into a respective side panel 217, 221. In the illustrated embodiment each of the score lines 277, 279 extends into one of the side panels 217, 221 and intersects the upper tear line 269 forming the tear strip 267. In one example, when the top end 245 is opened, the upper portions of the side panels 217, 221 and the top end flaps 235, 239 can fold outwardly along the score lines 277, 279 to form a six-sided shape in the top portion 207 while the bottom portion 209 can maintain a small footprint. In this example, food products can be easily loaded through the enlarged top end 245. Also, a user can easily reach into the package, grasp a portion of the food products, and withdraw a clenched hand through the enlarged top end 245 while holding some of the food products. The score lines 277, 279 could be otherwise shaped, arranged, configured, and/or omitted without departing from the disclosure.

In one embodiment, the upper region 283 can be sealed or otherwise closed at the top end 245 such as by sealing one portion of the upper region against another portion of the upper region. In one embodiment, the seal is a substantially air tight seal. Alternatively, the upper region 283 can be left open. The top end 245 of the carton 203 can be closed by overlapping and adhering the top end flaps 235, 237, 239, 241 (FIGS. 6C and 7). Alternative assembling, loading, and closing steps can be used without departing from the scope of this disclosure.

Figure 8A:
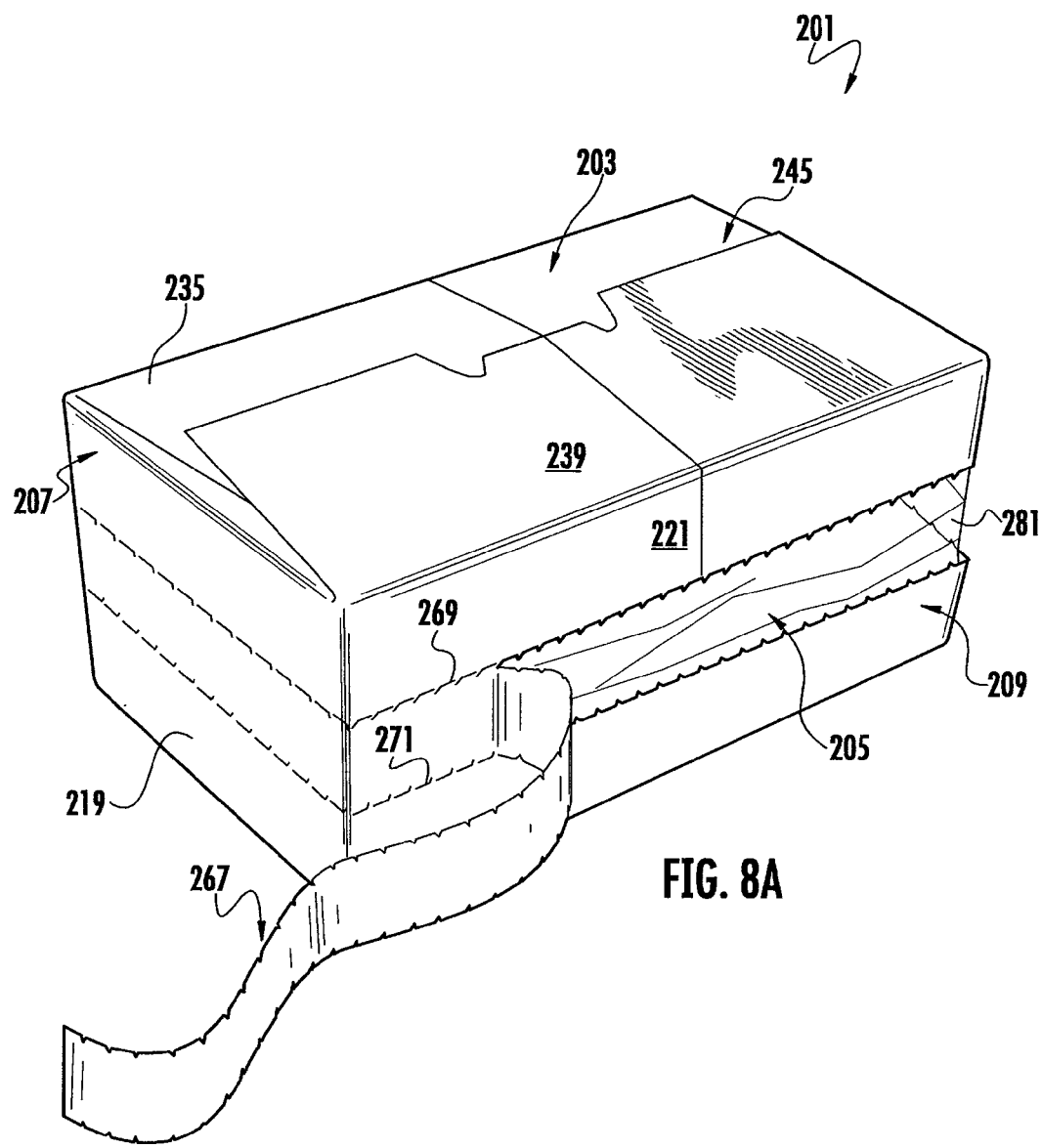
FIGS. 8A and 8B are perspective views of the carton of FIG. 7 illustrating the removal of a tear strip according to one embodiment of the disclosure.
Figure 8B:
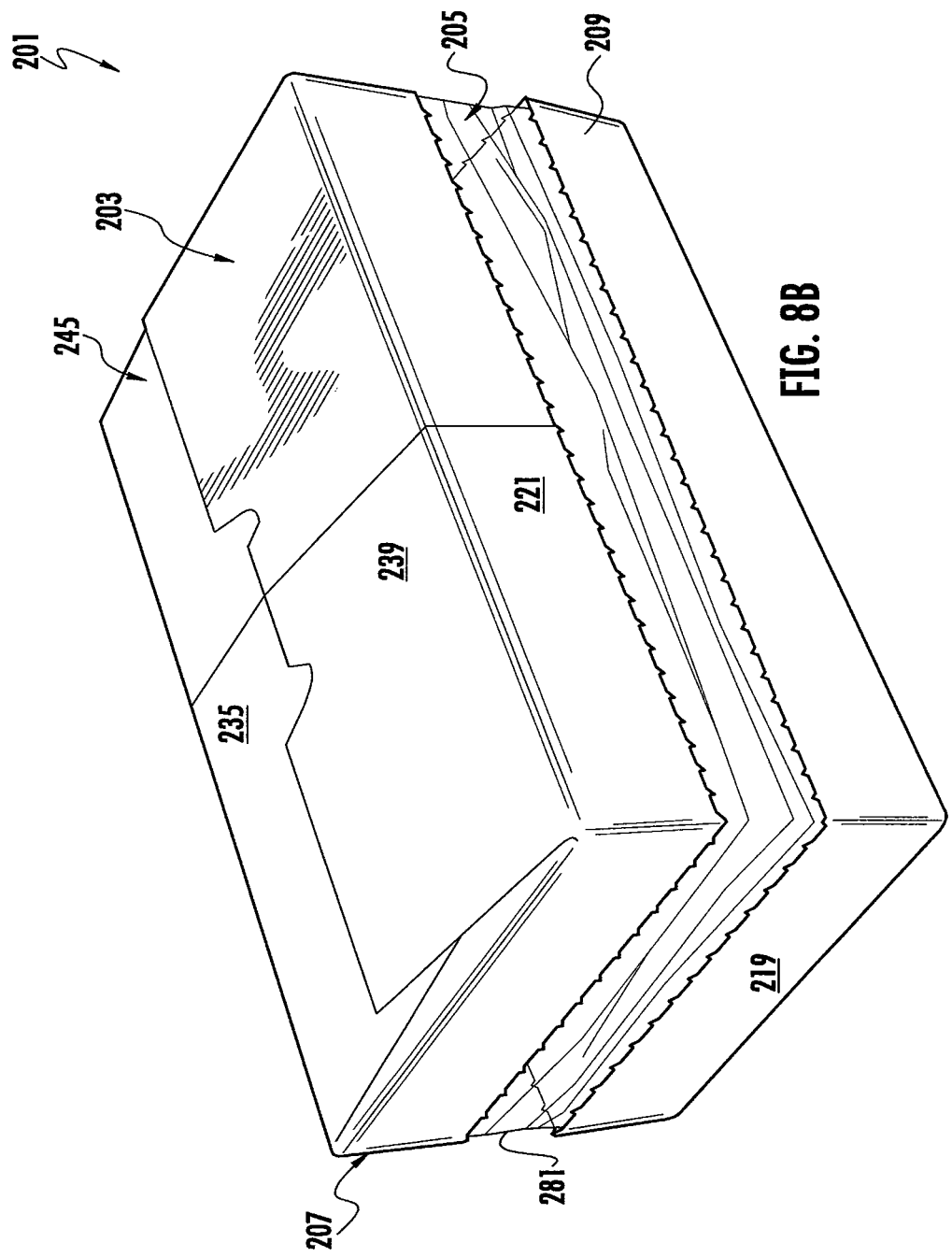

As shown in FIGS. 8A and 8B, the tear strip 267 can be removed to divide the top portion 207 of the carton 203 from the bottom portion 209 of the carton. When the tear strip 267 is removed, the liner 205 that forms the inner sidewall of the carton 203 is visible. As shown in FIG. 9, the top portion 207 can be raised relative to the bottom portion 209 to increase the volume of the interior space of the package 201. When the top portion 207 is raised, expandable region 281 of the liner 205 unfolds and expands so that the interior space 291 of the package is enclosed by the top portion 207 of the carton, the bottom portion 209 of the carton, and the liner that extends between the top portion and the bottom portion of the carton.

Figure 10:
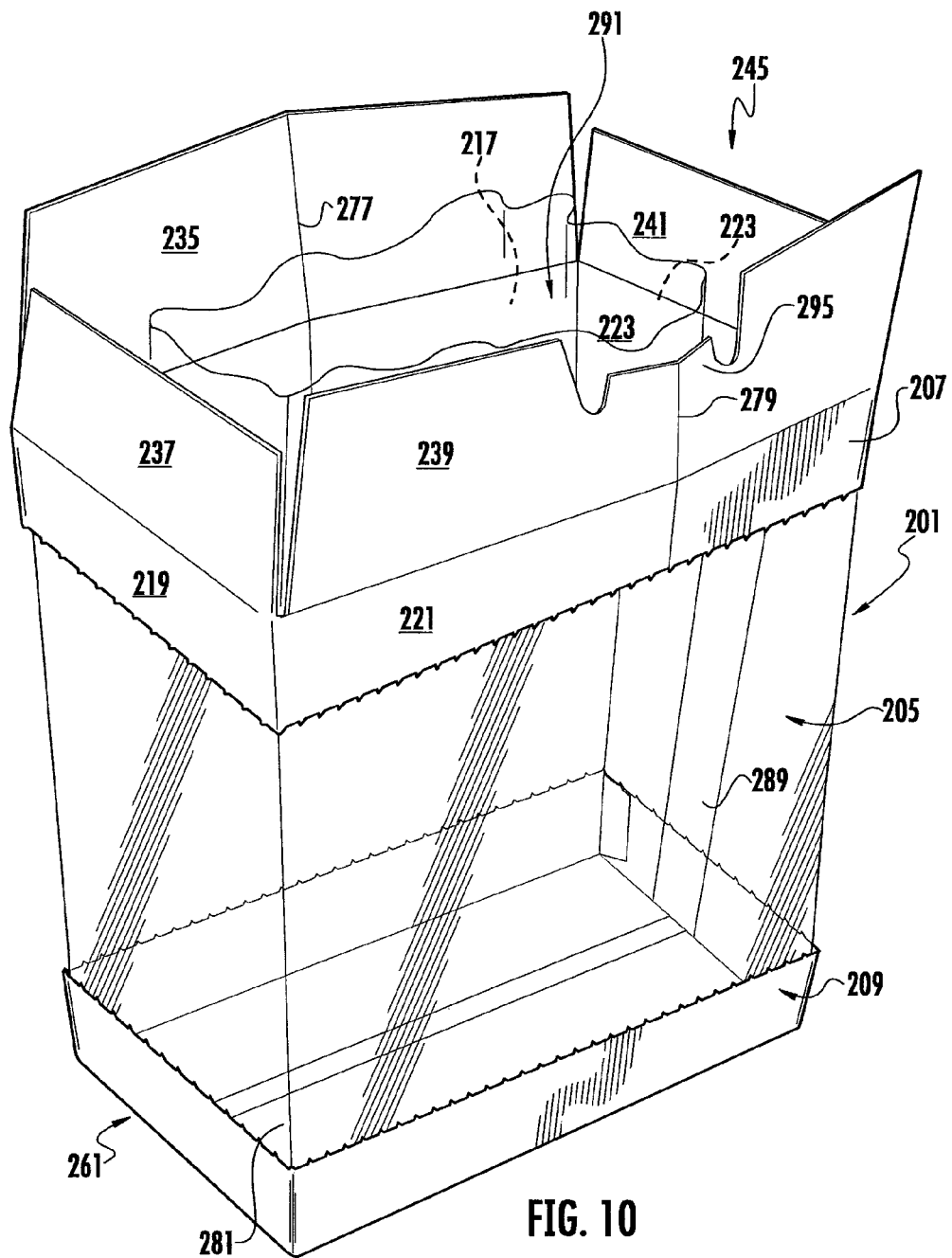

As shown in FIG. 10, the top portion 207 can be opened by separating the overlapped end flaps 235, 237, 239, 241, and the product can be removed from the opened top end 245. In one embodiment, a user can use the tab 295 extending from the third top end flap 239 to initiate opening of the top end 245 by pulling upwardly on the tab 295 to separate the third top end flap 239 from the first top end flap 235. Alternatively, the closed bottom end 261 can be opened by separating the overlapped end flaps 251, 253, 255, 257. Alternative tearing, opening, and reclosing steps can be used without departing from the scope of this disclosure.

The package 201 can be used to heat or cook a food product, or other nonfood product, such that the top portion 207 can be raised during the heating process due to heating of air in the interior space of the package. For example, the air in the package can expand to push the top portion 207 away from the bottom portion 209 when heated. Further, steam and other gases can evaporate or otherwise be released from the food product or from water added to the package before heating. In another example, the food product can be an expandable food product such as microwave popcorn that occupies an increased volume after heating or cooking the food product. The package 201 could be used with other food products without departing from the disclosure.

Any of the various embodiments of the present disclosure could include at least one microwave energy interactive element that may comprise a susceptor for becoming hot when exposed to microwave energy, although other types and various combinations of microwave energy interactive elements are also within the scope of the present disclosure, as will be discussed below. Also, the various embodiments of the present disclosure could be free of a microwave energy interactive element without departing from the disclosure.

A blank according to the present disclosure can be, for example, formed from coated paperboard and similar materials. For example, the interior and/or exterior sides of the blank can be coated with a clay coating. The clay coating may then be printed over with product, advertising, price coding, and other information or images. The blank may then be coated with a varnish to protect any information printed on the blank. The blank may also be coated with, for example, a moisture barrier layer, on either or both sides of the blank. In accordance with the above-described embodiments, the blank may be constructed of paperboard of a caliper such that it is heavier and more rigid than ordinary paper. The blank can also be constructed of other materials, such as cardboard, hard paper, or any other material having properties suitable for enabling the package to function at least generally as described herein. The blank can also be laminated or coated with one or more sheet-like materials at selected panels or panel sections.

In accordance with the above-described embodiments of the present disclosure, a fold line can be any substantially linear, although not necessarily straight, form of weakening that facilitates folding therealong. More specifically, but not for the purpose of narrowing the scope of the present disclosure, fold lines may include: a score line, such as lines formed with a blunt scoring knife, or the like, which creates a crushed portion in the material along the desired line of weakness; a cut that extends partially into a material along the desired line of weakness, and/or a series of cuts that extend partially into and/or completely through the material along the desired line of weakness; and various combinations of these features.

As an example, a tear line can include: a slit that extends partially into the material along the desired line of weakness, and/or a series of spaced apart slits that extend partially into and/or completely through the material along the desired line of weakness, or various combinations of these features. As a more specific example, one type tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

The above embodiments may be described as having one or more panels adhered together by glue during erection of the package embodiments. The term "glue" is intended to encompass all manner of adhesives commonly used to secure package panels in place.

The foregoing description illustrates and describes various embodiments of the present disclosure. As various changes could be made in the above construction, it is intended that all matter contained in the above description or shown in the accompanying drawings shall be interpreted as illustrative and not in a limiting sense. Furthermore, the present disclosure covers various modifications, combinations, and alterations, etc., of the above-described embodiments that are within the scope of the claims. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A package for holding a food product, the package comprising:
   a carton comprising:
   a plurality of panels that extend at least partially around an interior of the carton, the plurality of panels comprising at least two side panels;
   a tear feature extending at least partially across the plurality of panels for at least partially separating the carton into an upper portion and a lower portion;
   a liner disposed in the interior of the carton, the liner comprising an upper region, a lower region, and an expandable region proximate to the tear feature of the carton, the expandable region extends between the upper region of the liner and the lower region of the liner and comprises a first portion of the liner folded into face-to-face contact with a second portion of the liner so that when the upper portion of the carton is moved away from the lower portion of the carton the expandable region expands as the first and second portions of the liner unfold.

2. The package of claim 1, wherein at least a portion of the liner is secured to at least a portion of at least one panel of the plurality of panels.

3. The package of claim 1, wherein the upper region is secured to at least one panel of the plurality of panels above the tear feature in the upper portion of the carton, and the lower region of the liner is secured to the at least one panel of the plurality of panels below the tear feature in the lower portion of the carton.

4. The package of claim 1, wherein the expandable region of the liner is free to move relative to the carton.

5. The package of claim 3, wherein the tear feature comprises at least one tear line extending across each panel of the plurality of panels so that the upper portion of the carton is separable from the lower portion of the carton.

6. The package of claim 5, wherein the upper region of the liner is adhered to at least a portion of each panel of the plurality of panels above the at least one tear line, and the lower region of the liner is adhered to at least a portion of each panel of the plurality of panels below the at least one tear line.

7. The package of claim 6, wherein at least the expandable region of the liner is at least partially transparent.

8. The package of claim 1, wherein the tear feature comprises at least one longitudinal tear line.

9. The package of claim 8, wherein the at least one longitudinal tear line comprises a first longitudinal tear line and a second longitudinal tear line, and the tear feature further comprises a tear strip at least partially defined by the first and second longitudinal tear lines, the tear strip extending across each panel of the plurality of panels.

10. The package of claim 9, wherein the at least two side panels comprise a first side panel, a second side panel, a third side panel, and a fourth side panel, an adhesive flap being foldably connected to the first side panel and adhered to an interior surface of the fourth side panel, wherein the tear strip extends across the adhesive flap, and at least a portion of the tear strip extending in the fourth side panel is in face-to-face contact with at least a portion of the tear strip extending in the adhesive flap.

11. The package of claim 8, further comprising at least one end flap foldably connected to at least one panel of the plurality of panels for at least partially closing an end of the carton, wherein the at least one end flap comprises at least a first top end flap and a second top end flap respectively foldably attached to respective panels of the plurality of panels in the upper portion of the carton, the first and second top end flaps being overlapped with respect to one another to at least partially close a top end of the carton, and wherein a lateral score line extends at least partially across the first top end flap.

12. A package for holding a food product, the package comprising:
   a carton comprising:
   a plurality of panels that extend at least partially around an interior of the carton, the plurality of panels comprising at least two side panels;
   a tear feature extending at least partially across the plurality of panels for at least partially separating the carton into an upper portion and a lower portion;
   a liner disposed in the interior of the carton, the liner comprising an expandable region , an upper region, and a lower region, and the expandable region of the liner is proximate to the tear feature of the carton and extends between the upper region of the liner and the lower region of the liner, wherein the upper region is secured to at least one panel of the plurality of panels above the tear feature in the upper portion of the carton, the lower region of the liner is secured to the at least one panel of the plurality of panels below the tear feature in the lower portion of the carton, and at least a portion of the upper region of the liner is sealed against another portion of the upper region of the liner in the upper portion of the carton, and at least a portion of the lower region of the liner is sealed against another portion of the lower region of the liner in the lower portion of the container.

13. In combination, a carton blank and a liner for forming a package for holding a food product,
the carton blank comprising:
a plurality of panels comprising at least two side panels;
a tear feature extending at least partially across the plurality of panels, the tear feature extending between an upper portion and a lower portion of the carton blank;
a liner comprising an upper region, a lower region, and an expandable region, at least a portion of the liner being in face-to-face contact with at least a portion of an interior surface of the carton blank, the expandable region of the liner being proximate to the tear feature of the carton and extending between the upper region of the liner and the lower region of the liner and comprising a first portion of the liner folded into face-to-face contact with a second portion of the liner so that when an upper portion of the carton formed from the blank is moved away from a lower portion of the carton formed from the blank the expandable region expands as the first and second portions of the liner unfold.

14. The combination of claim 13, wherein at least a portion of the liner is secured to at least a portion of at least one panel of the plurality of panels.

15. The combination of claim 13, wherein the upper region is secured to at least one panel of the plurality of panels above the tear feature in the upper portion of the carton blank, the lower region of the liner is secured to the at least one panel of the plurality of panels below the tear feature in the lower portion of the carton blank, and the expandable region of the liner is free from connection to the carton blank.

16. The combination of claim 15, wherein the tear feature comprises at least one tear line extending across each panel of the plurality of panels so that the upper portion of the carton blank is separable from the lower portion of the carton blank.

17. The combination of claim 13, wherein the tear feature comprises a first longitudinal tear line, a second longitudinal tear line, and a tear strip at least partially defined by the first and second longitudinal tear lines, wherein the at least two side panels comprise a first side panel, a second side panel, a third side panel, and a fourth side panel, an adhesive flap being foldably connected to the first side panel, and wherein the tear strip extends across each of the first side panel, the second side panel, the third side panel, the fourth side panel, and the adhesive flap.

18. The combination of claim 17, further comprising at least one end flap foldably connected to at least one panel of the plurality of panels for at least partially closing an end of the carton formed from the blank, wherein the at least one end flap comprises at least a first top end flap and a second top end flap respectively foldably attached to respective panels of the plurality of panels in the upper portion of the carton, the first and second top end flaps for being overlapped with respect to one another to at least partially close a top end of a carton formed from the carton blank, and wherein a lateral score line extends at least partially across the first top end flap.

19. A method of forming a package for holding a food product comprising:
obtaining a carton blank comprising a plurality of panels comprising at least two side panels, a tear feature extending at least partially across the plurality of panels;
obtaining a liner comprising an upper region, a lower region, and an expandable region, the expandable region of the liner extends between the upper region of the liner to the lower region of the liner and comprises a first portion of the liner folded into face-to-face contact with a second portion of the liner;
positioning at least a portion of the liner in face-to-face contact with at least a portion of an interior surface of the carton blank so that the expandable region of the liner is proximate to the tear feature of the carton;
forming an interior of a carton by respectively folding the plurality of panels of the carton blank, wherein the tear feature extends between an upper portion and a lower portion of the carton;
activating the tear feature to separate the upper portion and the lower portion; and
moving the upper portion away from the lower portion to expand the expandable region and unfold the first and second portions of the liner.

20. The method of claim 19, wherein the method further comprises securing the upper region to at least one panel of the plurality of panels in the upper portion of the carton, and securing the lower region of the liner to the at least one panel of the plurality of panels in the lower portion of the carton.

21. The method of claim 20, wherein the carton blank further comprises at least one end flap foldably connected to at least one panel of the plurality of panels, the at least one end flap comprising at least one bottom end flap, and the method further comprises at least partially closing a bottom end of the carton by folding the at least one bottom end flap.

22. The method of claim 21, wherein the at least one end flap comprises at least one top end flap, and the method further comprises disposing at least one food product in the interior of the carton and at least partially closing a top end of the carton by folding the at least one top end flap.

23. The method of claim 21, wherein the at least one end flap comprises at least one top end flap, and the method further comprises sealing at least a portion of the lower region of the liner against another portion of the lower region of the liner in the lower portion of the carton, disposing at least one food product in the interior of the carton, sealing at least a portion of the upper region of the liner against another portion of the upper region of the liner in the upper portion of the carton, and at least partially closing a top end of the carton by folding the at least one top end flap.

24. The method of claim 20, wherein the tear feature comprises at least one tear line extending across each panel of the plurality of panels so that the upper portion of the carton is separable from the lower portion of the carton, and the method further comprises adhering the upper region of the liner to at least a portion of each panel of the plurality of panels above the at least one tear line and adhering the lower region of the liner to at least a portion of each panel of the plurality of panels below the at least one tear line.

25. The method of claim 19, wherein the tear feature comprises a first longitudinal tear line, a second longitudinal tear line, and a tear strip at least partially defined by the first and second longitudinal tear lines, the tear strip extending across each panel of the plurality of panels, wherein the at least two side panels comprise a first side panel, a second side panel, a third side panel, and a fourth side panel, an adhesive flap being foldably connected to the first side panel and the tear strip extending across the adhesive flap, and wherein the method further comprises adhering the adhesive flap to an interior surface of the fourth side panel so that at least a portion of the tear strip extending in the fourth side panel is in face-to-face contact with at least a portion of the tear strip extending in the adhesive flap.

* * * * *